United States Patent
Hollar

[19]

[11] Patent Number: 5,815,617
[45] Date of Patent: Sep. 29, 1998

[54] FIBER OPTIC CABLE CONNECTOR

[75] Inventor: Kenneth G. Hollar, Richton Park, Ill.

[73] Assignee: Federal Signal Corporation, University Park, Ill.

[21] Appl. No.: 736,985

[22] Filed: Oct. 25, 1996

[51] Int. Cl.⁶ .................................................. G02B 6/36
[52] U.S. Cl. .......................... 385/53; 385/621; 385/66; 385/68; 385/81
[58] Field of Search .................................. 385/53, 62, 63, 385/66, 68, 69, 81, 86, 87

[56] References Cited

U.S. PATENT DOCUMENTS

| | | | |
|---|---|---|---|
| 4,104,615 | 8/1978 | Hunter | 340/84 |
| 4,812,006 | 3/1989 | Osborn et al. | 350/96.21 |
| 5,136,672 | 8/1992 | Mulholland et al. | 385/53 |
| 5,311,410 | 5/1994 | Hsu et al. | 362/20 |
| 5,365,413 | 11/1994 | Krammer | 362/32 |
| 5,452,390 | 9/1995 | Bechtel et al. | 385/92 |
| 5,452,392 | 9/1995 | Baker et al. | 285/92 |
| 5,542,015 | 7/1996 | Hultermans | 385/60 |

*Primary Examiner*—Phan T. H. Palmer
*Attorney, Agent, or Firm*—Leydig, Voit & Mayer, Ltd.

[57] ABSTRACT

The invention provides a fiber optic cable connector consisting of a band having inner and outer surfaces and flexible between locked and unlocked positions in response to a compressive force, wherein the inner surface is dimensioned to slidably engage the protective jacket in the unlocked position. The ban has an inwardly projecting ridge for securely engaging the fiber optic cable jacket in the locked position for preventing relative movement between the band and the cable jacket. A sleeve has a bore including a tapered front section for receiving and exerting a compressive force on the band.

36 Claims, 2 Drawing Sheets

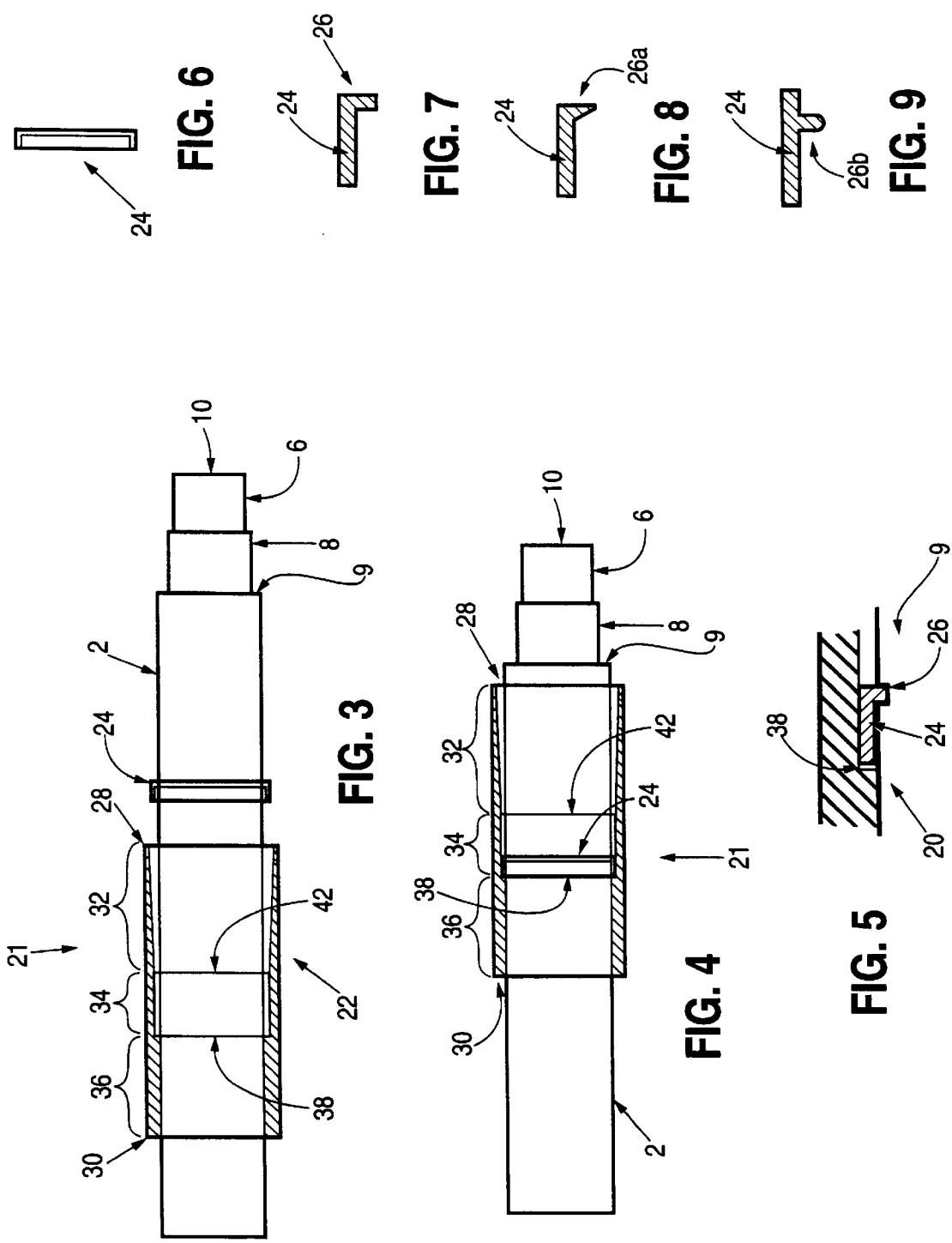

FIBER OPTIC CABLE CONNECTOR

TECHNICAL FIELD OF THE INVENTION

The present invention relates to a fiber optic cable system and, more particularly, to a cable connector for attaching fiber optic cable to a light source.

BACKGROUND OF THE INVENTION

Traditional lighting systems of all types incorporate a plurality of individual light sources to generate light output. In the home, a plurality of light sources or light bulbs are dispersed around the room. Lights must be turned on and off individually and each bulb replaced at the end of its usable life. Each light source requires individual hardware, rendering traditional home lighting relatively expensive and difficult to install. In emergency vehicles, colored flashing light patterns traditionally require a plurality of individual bulbs in separate rotating housings. As a result, emergency vehicles require sophisticated power supplies to handle the effects of the large motors rotating the light source and/or the surge effects of strobing lights. Housing the individual emergency lights in light bars also reduces the aerodynamics of emergency vehicles and requires extensive maintenance on each light unit to replace damaged bulbs.

Recent advances in fiber optic and light engine technology have addressed these and other disadvantages of traditional multisource lighting systems. Fiber optic technology allows for centralized lighting systems involving a light source assembly having a single, high-intensity light source and at least one fiber optic cable for conveying light signals from the light source to a plurality of light outlets. A single light source assembly is easier and more economical to maintain than traditional light systems. Additionally, a single light source may consume less overall power than multiple light sources employed in traditional lighting systems and draw power uniformly and continuously, minimizing the electrical surge effects of intermittent current demands. Since fiber optic cable systems occupy considerably less space than many light sources used in home lighting and the light bars in emergency vehicles, the light bar profile may be minimized to minimize the aerodynamic drag on emergency vehicles.

In order to focus the light properly onto the end of the fiber optic cable, the fiber optic cables must be securely attached to the light source assembly. Currently, several means are used for attaching a fiber optic cable to a light source. One method commonly employed uses a clear epoxy adhesive substance which is then cured, either at room temperature or at elevated temperatures. However, epoxy curing time is often protracted, are relatively messy, and can only be removed, if at all, with difficulty.

Other methods involve various mechanical devices for attaching a fiber optic cable. Unfortunately, many mechanical connectors require numerous or intricate parts which are relatively expensive to manufacture and difficult to assemble or disassemble. Many mechanical connectors may also apply excessive pressure to the fiber optic cable core, resulting in distortion of the light signal transmitted through the cable. The connectors may also require special tools or training, making them relatively difficult to use.

OBJECTS AND SUMMARY OF THE INVENTION

Accordingly, it is an object of the present invention to provide a light system comprising a fiber optic cable which may be easily attached to a light source.

Another object of the invention is to provide a fiber optic cable connector that permits quick and easy installation and removal.

Another object of the invention is to provide a fiber optic cable connector which may be used without specialized tools or training.

A related object is to provide a fiber optic cable connector device comprising relatively few parts which are easy to assemble or disassemble.

Another object of the present invention is to provide a fiber optic cable connector having a relatively streamlined profile.

Another object of the present invention is to provide a fiber optic cable connector device that minimizes or eliminates direct pressure on the fiber optic cable core.

Other objects and advantages of the present invention, as well as additional inventive features, will be apparent from the description of the invention provided herein.

BRIEF DESCRIPTION OF THE DRAWINGS

FIG. 3 is a partial cross sectional view of the fiber optic cable and the connector in a first or unlocked position;

FIG. 4 is a partial cross sectional view of the connector in a second or locked position;

FIG. 5 is a enlarged view illustrating the contact between a compression band, a sleeve and an inwardly projecting shoulder for preventing relative movement between the sleeve and the fiber optic cable jacket;

FIG. 6 is a cross sectional view, taken along the line 6—6 in FIG. 2, showing the compression band; and FIG. 7 is an enlarged view of the band illustrating an inwardly projecting radial rectangular ridge for fixedly engaging the fiber optic cable jacket.

FIG. 8 is an enlarged view of the sleeve illustrating an inwardly projecting radial tapered ridge for fixedly engaging the fiber optic cable jacket.

FIG. 9 is an enlarged view of the sleeve illustrating an inwardly projecting radial rounded ridge for fixedly engaging the fiber optic cable jacket.

Figure 1:
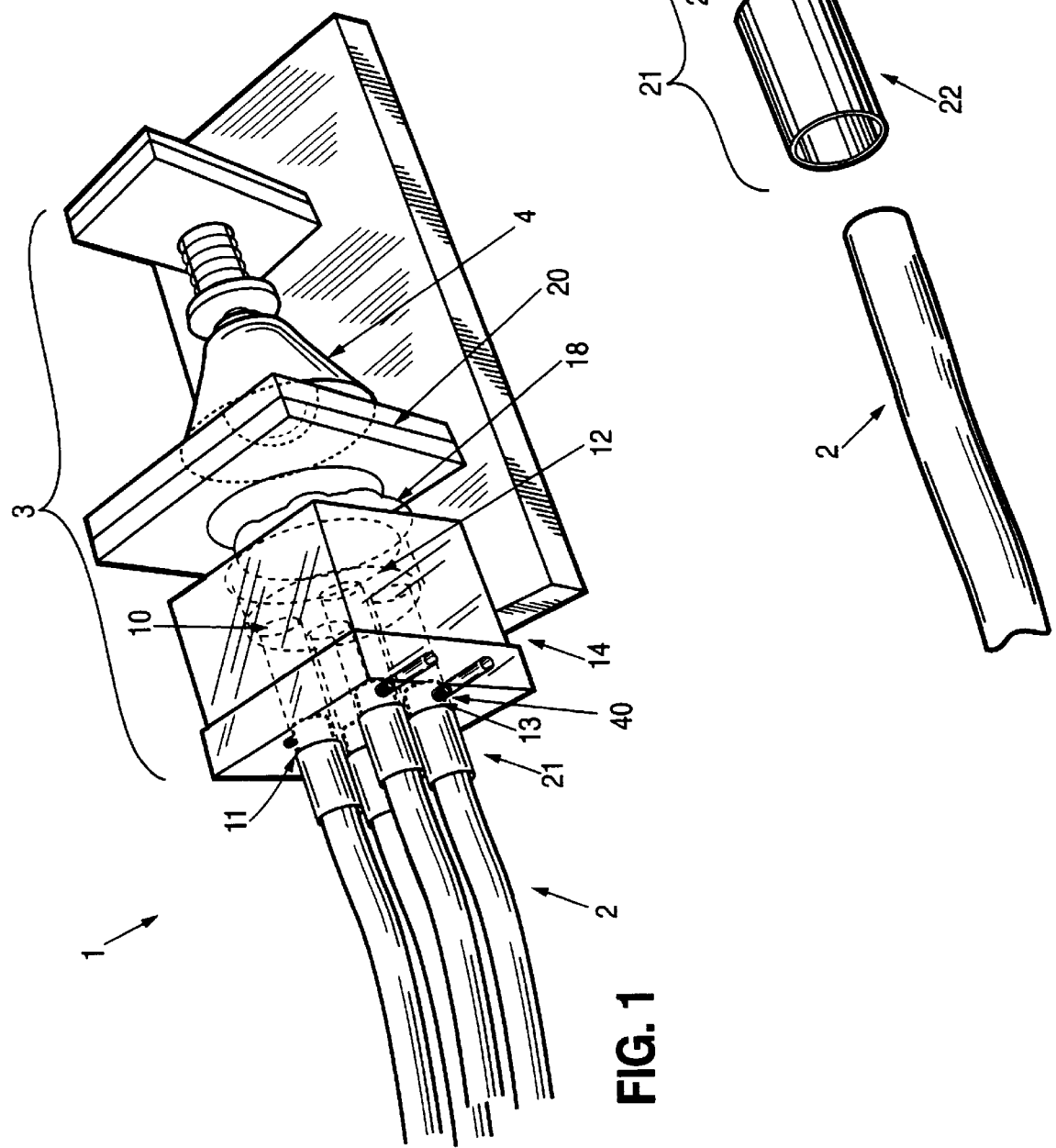
FIG. 1 is a schematic view of a light source assembly showing a connector for connecting a fiber optic cable to a light source in accordance with the invention.

While the invention is amenable to various modifications and alternative constructions, certain illustrated embodiments thereof have been shown in the drawings and will be described below in detail. It should be understood, however, that there is no intention to limit the invention to the specific embodiments disclosed, but on the contrary, the intention is to cover all modifications, alternative constructions, and equivalents falling within the spirit and scope of the invention as expressed in the appended claims.

The invention may best be understood with reference to the accompanying drawings and in the following detailed description.

DETAILED DESCRIPTION OF THE INVENTION

Referring to the figures, FIG. 1 illustrates one embodiment of a fiber optic cable system 1 in accordance with the present invention. In the illustrated embodiment, the fiber optic cable or light engine cable system 1 comprises a light source assembly 3 for receiving and holding at least one fiber optic cable 2. The light source assembly 3 comprises a light source or lamp 4, which is preferably a high intensity discharge lamp (HID) or a xenon-metal halide lamp emitting broadband light, for illuminating the fiber optic cable ends 10. As seen in FIG. 4, the fiber optic cable 2 has a central core 6 which transmits the light signals, a Teflon jacket 8 covering the core 6, and an outer protective jacket 9 for protecting the Teflon jacket 8 and the core 6. The assembly 3 may have a retainer block 12 and guide member 14 for holding each fiber optic cable end 10 in a predetermined and stationary orientation relative to the light source 4. Each fiber optic cable end 10 may have a corresponding lens 18 for focusing light at each fiber optic cable end 10 and a filter member 20 disposed between the light source 4 and the fiber optic cable end 10 for filtering certain electromagnetic wavelengths, such as infrared radiation, from the light source 4.

Figure 2:
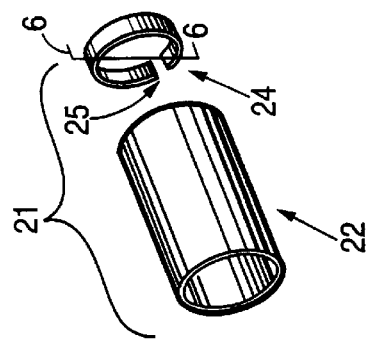
FIG. 2 is an exploded view depicting the assembly of the connector to the cable.

In accordance with certain objects of the invention, the light source assembly 3 comprises a fiber optic cable connector, generally depicted as 21, for attaching the fiber optic cable jacket 9 to the retainer 12. As best shown in FIG. 2, the fiber optic cable connector 21 comprises a sleeve 22 and a compression band 24.

As best shown in FIGS. 3–4, the compression band 24 has a cross-sectional shape adapted for engaging the exterior of the protective jacket 9. The band 24 may be made from a material which may be deformed between a first or unlocked position and a second or locked position in response to an external compressive force. In the first or unlocked position shown in FIG. 3, the band 24 is free to slidably engage the exterior of the protective jacket 9. In the second or locked position shown in FIG. 4, the band 24 tightly engages the exterior of the fiber optic cable jacket 9 for preventing relative movement therebetween.

In the embodiment illustrated in FIG. 2, the band 24 has a generally circular shape with a slot 25 for permitting the band 24 diameter to be varied to accommodate different size fiber optic cables in the first/unlocked position. The band 24, however, may have other cross-sectional shapes and dimensions permitting it to slidably engaging the fiber optic cable jacket 9, including, for example, elliptical or semicircular cross sections. The band 24 is preferably constructed of a flexible or deformable material such as metal or plastic which permits the band 24 to be flexed between the locked and unlocked positions.

In accordance with certain objects of the invention, the band 24 has means for securely engaging the fiber optic cable jacket 9 in the second or locked position while minimizing and preferably eliminating pressure exerted on the fiber optic cable core 6. In the illustrated embodiments, the engaging means comprises a ridge 26 projecting inwardly from the inner surface of the band 24. The engaging means preferably has a shape permitting slight penetration the surface of the protective fiber optic cable jacket 9 without penetration of the fiber optic cable core 6. In a typical jacket 9 having a thickness of about 0.04 inches, it has been found that a ridge 26 penetrating about 0.005–0.010 inches into the jacket 9 is sufficient to prevent movement between the band 24 and the fiber optic cable jacket 9 while minimizing any forces on the core 6.

In the embodiment illustrated in FIG. 7, the ridge 26a has a rectangular configuration extending perpendicularly and continuously around the peripheral edge of the band 24. As generally shown in FIGS. 8–9, other embodiments of the engaging means may comprise a wedge-shaped ridge 26a (FIG. 8) or rounded ridge 26b (FIG. 9), a plurality of inwardly projecting ridges and/or a discontinuous ridge (not shown).

In accordance with certain objects of the invention, the sleeve 22 has a bore 31 for slidably engaging the fiber optic cable jacket 9 and slidably receiving the band 24 in either its locked (FIG. 4) or unlocked (FIG. 3) positions and means for compressing the band 24 between the unlocked and locked position. Referring to FIGS. 3 and 4, the bore is defined by front 28 and rear 30 edges and a front tapered section 32 and, preferably, middle 34 and rear 36 sections.

In accordance with certain objects of the invention, the sleeve 22 has means for compressing the band 24 between the unlocked and locked positions while minimizing or eliminating direct pressure on the fiber optic core 6. In the illustrated embodiment, FIGS. 3–4, the compressing means comprises the front or tapered section 32 sized to slidably receive the band 24. As shown in FIGS. 3–4, tapered section 32 has an inwardly tapered cross section for progressively exerting a compressive force on the exterior of the band 24 in response to inward movement of the band 24 relative to the sleeve 22. It will be appreciated that the compressive force exerted on the band 24 deforms and compresses the band 24 from the unlocked position (FIG. 3) to the locked position (FIG. 4). To properly receive the band 24, the inner diameter of the front sleeve edge 28 should be sized for receiving the band 24 in its largest unlocked position. Conversely, the second end 42 of the tapered section 28 should be sized to terminate compression of the band 24 for minimizing the force exerted on the fiber optic cable 6 and for preventing the ridge 26 from penetrating the Teflon 8 or the core 8.

In other embodiments (not shown), the compressing means may comprise the external surface of the band 24 and the internal surface of the bore 31 having cooperating threads permitting the sleeve 22 to threadedly engage the band 24 by screwing the sleeve 22 onto the band 24. In yet another embodiment of the compressing means (not shown), the front section may have a constant cross-section whereas the external surface of the band 24 has an outwardly tapered cross-section so that engagement between the sleeve 22 and band 24 creates a compressive force on the band 24.

The middle section 34, defined between the second end 42 of the tapered section 32 and a shoulder 38, is adapted for receiving the band 24 in the locked position. As depicted in FIGS. 4–5, the shoulder 38 projects outwardly from the inner surface of the middle section 34 for engaging the band 24 and limiting the inboard movement of the band 24 relative to the sleeve 22. In the depicted embodiment, the shoulder 38 projects perpendicularly and extends continuously from the inner surface of the bore, but it will be appreciated that in other embodiments, the shoulder 38 dimensions may vary, and may have sloped, rounded or discontinuous configurations which limit movement between the band 24 and the sleeve 22. The shoulder 38 marks the front edge of the rear bore section 36 which is dimensioned to slidably receive the protective fiber optic cable jacket 9.

In order to attach the fiber optic cable jacket 9 to the retaining block 12, the sleeve 22 must be mounted on the fiber optic cable jacket 9 by inserting the fiber optic cable end 10 through the rear edge of the sleeve bore 30 so that the front edge 28 faces the fiber optic cable end 10 as depicted in FIGS. 3 and 4. The compression band 24 is subsequently mounted on the fiber optic cable jacket 9 in the unlocked position (FIG. 3) by sliding the cable end 10 through the band 24. The band 24 may generally be positioned about one inch from the cable end 10. In this initial position, both the compression band 24 and the sleeve 22 slidably engage the cable jacket 9 and may freely move along the length of the cable 2.

In order to lock the band 24 in a predetermined position along the cable jacket 9, the band 24 is positioned at the desired position and the sleeve 22 is moved toward the band 24 so that the front edge 28 and the front tapered section 32 engage the band 24. It should now be appreciated that, in response to the relative movement between the sleeve 22 and the band 24, the tapered section 32 exerts pressure against the compression band 24, causing the band 24 to flex from the unlocked position (FIG. 3) to the locked position (FIG. 4). In response to the compressive pressure, the ridge 26 penetrates into the protective jacket 9, preventing any relative movement between the band 24 and the jacket 9. In accordance with certain objects of the invention, however, the ridge 26 is sized to prevent penetration through the jacket 9 and into either the Teflon jacket 8 or the core 6. Since the band 24 places no direct pressure on the fiber optic cable core 6 in locked position, the fiber optic cable 2 may be retained to a substrate without causing distortion of the light signal through the cable 2.

As shown in FIGS. 4–5, engagement between the band 24 and the shoulder 38 in the locked position prevents further movement between the sleeve 22 and the band 24 and the fiber optic cable jacket 9. Thereafter, as depicted in FIG. 1, the fiber optic cable end 10 and the connector 21 may be inserted into the hole 11 located in the retaining block 12 so that the cable end 10 is properly disposed at the desired orientation relative to the light source 4. In the embodiment illustrated in FIG. 1, means for locking the fiber optic cable and the connector 21 in the retaining block 12 comprises a plurality of set screws 40 and corresponding holes 13 in the retaining block 12. It will be appreciated that once the sleeve 22 is locked into the retaining block 11, the shoulder 38 prevents withdrawal of the band 24 and the fiber optic cable 2. Since the set screws 40 engage and lock the sleeve 22 in the retaining block 12 without engaging the fiber optic cable itself as generally shown in FIG. 1, the set screws 40 do not damage the fiber optic cable by penetrating the core 6. Other attaching means may comprise an externally threaded sleeve 22 adapted for threadedly engaging complimentary threads in the retaining hole 11.

In a like manner, the connector 21 may be attached at the middle of the fiber optic cable or at the light output end so that the fiber optic cable may be attached to any surface along the length of the cable, such as, for example, a wall.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A connector for a fiber optic cable having a light transmitting core and a protective jacket surrounding the core, the connector comprising:
   a band having inner and outer surfaces and is flexible between locked and unlocked positions in response to a compressive force, wherein the inner surface is dimensioned to slidably engage the protective jacket in the unlocked position and has means for securely engaging the fiber optic cable jacket in the locked position for preventing relative movement between the band and the cable jacket, and means for exerting the compressive force on the band so that the band securely engages the cable jacket, and wherein the outer surface has a substantially smooth surface without any projections for permitting the band to disengage from the exerting means after the exerting means has compressed the band into secure engagement with the cable jacket.

2. The connector as set forth in claim 1 wherein the exerting means comprises a sleeve having a bore for receiving the band and exerting the compressive force on the band for flexing the band from the unlocked position to the locked position.

3. The connector as set forth in claim 2 wherein the bore has a tapered section defined by front and rear ends for exerting the compressive force on the band in response to movement of the band towards the rear end.

4. The connector as set forth in claim 3 wherein the front end is dimensioned for receiving the band in the unlocked position and the rear end is dimensioned to terminate compression of the band at a predetermined point for preventing penetration of the engaging means through the jacket.

5. The connector as set forth in claim 2 wherein the bore has front and rear ends and the outer surface of the band tapers outwardly so that the bore exerts a compressive force on the band in response to movement of the band towards the rear end.

6. The connector as set forth in claim 2 wherein the surface of the bore and the outer surface of the band have cooperating threads so that the bore threadedly receives the band.

7. The connector as set forth in claim 3 wherein the bore has a middle section inboard of the rear end of the tapered section and an inwardly projecting shoulder for engaging the band and preventing inboard movement of the band.

8. The connector as set forth in claim 3 wherein the bore has a middle section inboard of the rear end of the tapered section and dimensioned to terminate compression of the band.

9. The connector as set forth in claim 1 wherein the engaging means comprises at least one inwardly projecting ridge for penetrating the surface of the jacket without deforming the core.

10. The connector as set forth in claim 9 wherein the ridge has a rectangular configuration for penetrating the surface of the jacket without deforming the core.

11. The connector as set forth in claim 9 wherein the ridge has a rounded configuration for penetrating the surface of the jacket without deforming the core.

12. The connector as set forth in claim 9 wherein the ridge has a wedge configuration for penetrating the surface of the jacket without deforming the core.

13. The connector as set forth in claim 9 wherein the ridge extends continuously around the circumference of the band.

14. The connector as set forth in claim 9 wherein the ridge extends around a portion of the band.

15. The connector as set forth in claim 9 wherein the ridge is disposed at the peripheral edge of the band.

16. The connector as set forth in claim 9 wherein the ridge is disposed inboard of the peripheral edge of the band.

17. The connector as set forth in claim 1 wherein the band has an annular configuration for engaging the entire jacket.

18. The connector as set forth in claim 1 wherein the band has a penannular configuration.

19. The connector as set forth in claim 1 wherein the band completely circumscribes the jacket.

20. A light source assembly comprising:
- a light source for illuminating an end of at least one fiber optic cable, the fiber optic cable having a core for transmitting signals and a protective jacket surrounding the core,
- a connector including a band having inner and outer surfaces and flexible between locked and unlocked positions in response to a compressive force, wherein the inner surface is dimensioned to slidably engage the protective jacket in the unlocked position and has means for securely engaging the fiber optic cable jacket in the locked position for preventing relative movement between the band and the cable jacket, and means for exerting the compressive force on the band so that the band securely engages the cable jacket, and wherein the outer surface has a substantially smooth surface without any projections for permitting the band to disengage from the exerting means after the exerting means has compressed the band into secure engagement with the cable jacket, and
- a retaining block having a hole for receiving and retaining at least one cable in predetermined position relative to the light source.

21. The light source assembly as set forth in claim 20 wherein the exerting means comprises a sleeve having a bore for receiving the band and exerting the compressive force on the band for flexing the band from the unlocked position to the locked position.

22. The light source assembly as set forth in claim 21 wherein the bore has a tapered section defined by front and rear ends for exerting the compressive force on the band in response to movement of the band towards the rear end.

23. The light source assembly as set forth in claim 22 wherein the bore has a middle section inboard of the rear end of the tapered section and an inwardly projecting shoulder for engaging the band and preventing inboard movement of the band.

24. The light source assembly as set forth in claim 21 wherein the surface of the bore and the outer surface of the band have cooperating threads so that the bore threadedly receives the band.

25. The light source assembly as set forth in claim 21 wherein the bore has front and rear ends and the outer surface of the band tapers outwardly so that the bore exerts a compressive force on the band in response to movement of the band towards the rear end.

26. The light source assembly as set forth in claim 22 wherein the bore has a middle section inboard of the rear end of the tapered section and dimensioned to terminate compression of the band.

27. The light source assembly as set forth in claim 20 wherein the engaging means comprises at least one inwardly projecting ridge for penetrating the surface of the jacket without deforming the core.

28. The light source assembly as set forth in claim 27 wherein the ridge has a rectangular configuration for penetrating the surface of the jacket without deforming the core.

29. The light source assembly as set forth in claim 27 wherein the ridge has a rounded configuration for penetrating the surface of the jacket without deforming the core.

30. The light source assembly as set forth in claim 27 wherein the ridge has a wedge configuration for penetrating the surface of the jacket without deforming the core.

31. The light source assembly as set forth in claim 27 wherein the ridge extends continuously around the circumference of the band.

32. The light source assembly as set forth in claim 27 wherein the ridge extends around a portion of the band.

33. The light source assembly as set forth in claim 27 wherein the ridge is disposed at the peripheral edge of the band.

34. The light source assembly as set forth in claim 27 wherein the ridge is disposed inboard of the peripheral edge of the band.

35. The light source assembly as set forth in claim 20 wherein the hole in the retaining block is further dimensioned for receiving the connector, and the retaining block comprises means for engaging the connector to retain the fiber optic cable in the hole without deforming the core and interfering with signal transmissions through the core.

36. The light source assembly as set forth in claim 35 wherein the engaging means comprises a screw-like member for engaging an outer surface of the connector.

* * * * *